(12) United States Patent
Orleskie et al.

(10) Patent No.: US 7,406,880 B2
(45) Date of Patent: Aug. 5, 2008

(54) AVERAGING ORIFICE PRIMARY FLOW ELEMENT

(75) Inventors: Charles T. Orleskie, Berthoud, CO (US); Terry X. Beachey, Longmont, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 11/693,485

(22) Filed: Mar. 29, 2007

(65) Prior Publication Data
US 2007/0214896 A1    Sep. 20, 2007

Related U.S. Application Data

(63) Continuation of application No. 10/119,283, filed on Apr. 9, 2002, now Pat. No. 7,284,450.

(51) Int. Cl.
G01F 1/46  (2006.01)
G01F 1/37  (2006.01)

(52) U.S. Cl. .................. 73/861.65; 73/861.52
(58) Field of Classification Search ............. 73/861.65, 73/861.66
See application file for complete search history.

(56) References Cited

U.S. PATENT DOCUMENTS

| | | | |
|---|---|---|---|
| 1,093,229 A * | 4/1914 | Wilkinson | 73/861.65 |
| 2,687,645 A | 8/1954 | Velten et al. | |
| 3,071,001 A | 1/1963 | Goldsmith | |
| 3,449,954 A * | 6/1969 | Brown | 73/861.65 |
| 3,487,688 A | 1/1970 | Magliozzi | |
| 3,521,487 A | 7/1970 | Akeley | |
| 3,545,492 A | 12/1970 | Scheid, Jr. | |
| 3,590,637 A * | 7/1971 | Brown | 73/861.65 |
| 3,645,298 A | 2/1972 | Roberts et al. | |
| 3,733,898 A | 5/1973 | Yamamoto et al. | |
| 3,750,710 A | 8/1973 | Hayner | |
| 3,779,076 A | 12/1973 | Akeley | |

(Continued)

FOREIGN PATENT DOCUMENTS

GB    0522708    6/1992

(Continued)

OTHER PUBLICATIONS

Supplementary European Search Report issued in EP 03709290.5 on Mar. 29, 2007.

*Primary Examiner*—Harshad Patel
(74) *Attorney, Agent, or Firm*—Marshall, Gerstein & Borun LLP

(57) ABSTRACT

A process flow device includes a self-averaging pitot tube type of primary flow element for measuring, by a differential pressure process, the volumetric rate of fluid flow at a point in a fluid carrying conduit where the velocity profile of the fluid is asymmetric with respect to the longitudinal axis of the conduit. The improved flow element comprises an annulus having a central opening and a pitot tube type flow-impeding device disposed transversely across the central opening and perpendicular to the longitudinal axis of the conduit. The pitot tube type flow-impeding device includes a plurality of total pressure ports in an upstream facing surface, a plurality of static pressure ports in a downstream facing surface, and total and static pressure plenums connected in fluid communication respectively to the total and static pressure ports.

13 Claims, 5 Drawing Sheets

U.S. PATENT DOCUMENTS

| | | | |
|---|---|---|---|
| 3,805,612 A | 4/1974 | Shiba | |
| 3,838,598 A | 10/1974 | Tompkins | |
| 4,040,293 A | 8/1977 | Wilson | |
| 4,425,807 A * | 1/1984 | Victor | 73/861.65 |
| 4,538,470 A | 9/1985 | Snell | |
| 4,557,296 A | 12/1985 | Byrne | |
| 4,592,239 A * | 6/1986 | Cutler | 73/861.66 |
| 4,884,460 A | 12/1989 | Nowacki et al. | |
| 4,961,344 A | 10/1990 | Rodder | |
| 5,036,711 A * | 8/1991 | Good | 73/861.66 |
| 5,086,655 A | 2/1992 | Fredericks et al. | |
| 5,279,155 A | 1/1994 | Johnson et al. | |
| 5,295,397 A | 3/1994 | Hall et al. | |
| 5,297,426 A | 3/1994 | Kane et al. | |
| 5,327,941 A | 7/1994 | Bitsakis et al. | |
| 5,341,848 A | 8/1994 | Laws | |
| 5,461,932 A | 10/1995 | Hall et al. | |
| 5,529,093 A | 6/1996 | Gallagher et al. | |
| 5,596,152 A | 1/1997 | Bergervoet et al. | |
| 5,736,651 A * | 4/1998 | Bowers | 73/861.66 |
| 5,773,726 A * | 6/1998 | Mahoney et al. | 73/861.65 |
| 5,817,950 A | 10/1998 | Wiklund et al. | |
| 5,969,266 A * | 10/1999 | Mahoney et al. | 73/861.65 |
| 6,053,055 A | 4/2000 | Nelson | |
| 6,164,142 A | 12/2000 | Dimeff | |
| 6,186,179 B1 | 2/2001 | Hill | |
| 6,311,568 B1 | 11/2001 | Kleven | |
| 6,321,166 B1 | 11/2001 | Evans et al. | |
| 6,345,536 B1 | 2/2002 | Morrison et al. | |
| 6,494,105 B1 | 12/2002 | Gallagher | |
| 6,543,297 B1 | 4/2003 | Kleven | |
| 6,622,573 B2 | 9/2003 | Kleven | |
| 6,928,884 B1 * | 8/2005 | Pearson | 73/861.42 |

FOREIGN PATENT DOCUMENTS

| | | |
|---|---|---|
| JP | 58191922 | 11/1983 |
| JP | 63253258 | 4/1987 |
| WO | WO-95/02165 | 7/1994 |
| WO | WO-99/40393 | 8/1999 |

\* cited by examiner

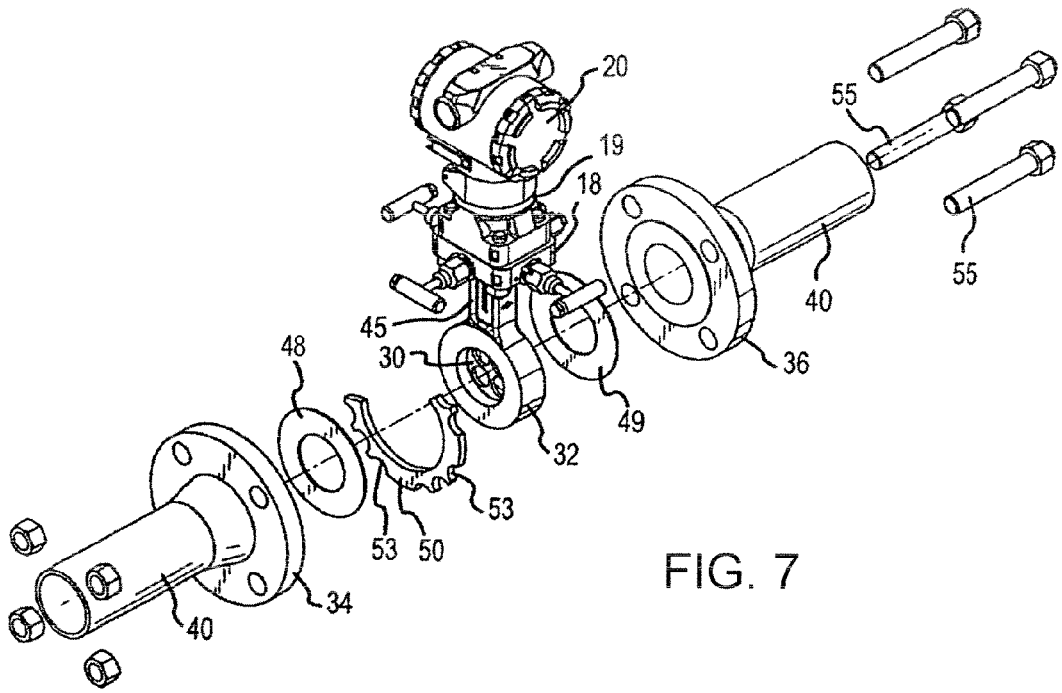
FIG. 7
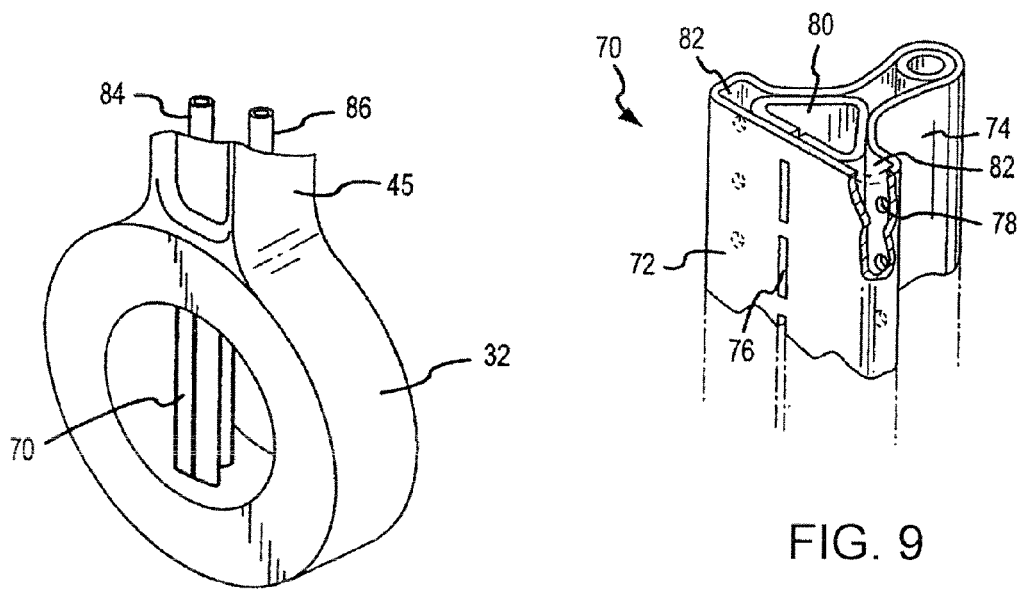
FIG. 8
FIG. 9

AVERAGING ORIFICE PRIMARY FLOW ELEMENT

RELATED APPLICATIONS

This application is a continuation of and claims priority to U.S. patent application Ser. No. 10/119,283 which was filed on Apr. 9, 2002, and allowed on Feb. 13, 2007, the entire specification of which is hereby incorporated by reference herein.

FIELD OF THE INVENTION

The present invention relates generally to a process flow device that includes a self-averaging orifice plate type of primary flow element for measuring, by a differential pressure process, the volumetric rate of fluid flow at a point in a fluid carrying conduit where the velocity profile of the fluid is asymmetric with respect to the longitudinal axis of the conduit.

BACKGROUND OF THE INVENTION

Orifice plate flow meters having a single centered opening in a plate constriction that is disposed diametrically within a fluid carrying pipe, with differential pressure measurement means on the upstream and downstream sides of the constriction, have been in existence for a long period of time. While the accuracy of such devices is good for long runs of pipe, orifice plate flow meters suffer the disadvantage of poor performance when placed in short pipe runs that follow a flow disturbance created by upstream apparatus, such as an elbow, expander, reducer, valve or other discontinuity. For measurement accuracy with an orifice plate flow meter, a long straight run of pipe (in excess of ten diameters in some instances) upstream of the flow meter is required in order to present a fully developed symmetrical velocity profile to the orifice plate, with the highest fluid velocity occurring coaxially with the center of the orifice plate constriction. When an upstream pipe fitting or other device skews the velocity profile, the pressures measured at the orifice flow meter pressure taps is in error.

To reduce the asymmetry of the velocity profile created by an upstream fitting, the commonly used apparatus is a flow straightener, of the type disclosed in U.S. Pat. No. 5,596,152 or apparatus similar to the flow conditioner described in U.S. Pat. No. 3,733,898. A more complex apparatus, employing a plurality of elongated openings arranged in a predetermined pattern in a transversely disposed plate within the fluid-conducting pipe, together with a computer to deal with the necessary algorithms, is disclosed in U.S. Pat. No. 5,295,397. Yet another device for reducing the adverse measuring effects of a distorted velocity profile is known as the piezometer ring. This appliance may surround the orifice on both sides of the orifice plate and, by means of a plurality of circumferentially disposed pressure sensing ports, averages pressures around the upstream and downstream sides of the orifice. Although not shown with an orifice plate flow meter, a piezometer type of averaging sensor is described generally in U.S. Pat. No. 5,279,155.

Flow straighteners, conditioners, computers and piezometers are moderately effective to properly condition the velocity profile for introduction to an orifice plate flowmeter, or average the asymmetric velocity of the flow, but have the disadvantage of adding separate and additional components to the process piping with the attendant initial cost, pressure drop in the fluid, and increased maintenance requirements.

Accordingly, the primary object of the present invention is to provide a primary flow element that achieves the accuracy benefits of the orifice plate type of flow meter, but is not restricted to long runs of upstream piping prior to the flow meter's positioning in the pipe.

A corresponding objective of the invention is to provide a primary flow element where the means for interrupting the fluid flow is a differential pressure orifice plate that achieves an averaging of the differential pressures across the plate, despite velocity profile distortion of the fluid presented to the primary flow element, and without the added piezometer and its computer, flow straightening or flow conditioning apparatus.

Other and further objects, features and advantages of the invention will become apparent from the following description of embodiments of the invention, taken in conjunction with the accompanying drawings.

SUMMARY OF THE INVENTION

The successful operation of traditional orifice plate flow meters is based on Bernoulli's theorem which states that along any one streamline in a moving fluid, the total energy per unit mass is constant, being made up of the potential energy, the pressure energy and the kinetic energy of the fluid. Thus, when fluid passes through the orifice in a constricting pipe plate, the velocity of the fluid through the orifice increases. This increase in fluid velocity causes the dynamic pressure of the fluid immediately downstream of the orifice plate to increase, while simultaneously decreasing the static pressure of the fluid at that same point. By sensing the static pressure on the upstream and downstream sides of the orifice plate, the decrease of static pressure on the downstream side results in a measurement of the pressure differential, dP, between the upstream side of the orifice plate and the downstream side. The rate of fluid flow q is proportional to $\sqrt{dP}$. As earlier stated, prior art orifice plate flow meters work well when the velocity profile is symmetrical about the longitudinal axis of the pipe in which the fluid is flowing. In such a case, the highest velocity fluid is along the central axis of the pipe, coaxial with the orifice of the constricting pipe plate. When traveling through the orifice, the highest velocity fluid is the fluid that produces the pressure differential across the plate to provide the flow rate result.

However, if the velocity profile is skewed a lower velocity fluid will pass through the orifice and the downstream static pressure will be a reflection of that lower velocity fluid. The differential pressure thus produced across the constricting plate will not be a true indication of the rate of fluid flow.

According to the present invention, a constrictive plate, or flow impedance device, having a plurality of variously positioned orifices is placed in a fluid-carrying conduit with static pressure measurement taken on the upstream and downstream sides of the plate. Each of the plurality of orifices will conduct a part of the total fluid flow within the conduit. According to Bernoulli's theorem, the velocity of the fluid through each of the orifices will increase, and the static fluid pressure on the downstream side of the constricting plate that is attributable to each of the separate orifices will be averaged within the fluid to provide an average downstream static pressure. The average downstream static pressure is compared with the upstream static pressure to provide an average differential pressure for whatever velocity profile is presented to the multiple orifice plate, resulting in an accurate measurement of the rate of fluid flow in the pipe.

Integrally incorporating the multiple orifice plate into the central opening of an annular ring with intermediate upstream and downstream static pressure measuring ports disposed within the ring, provides added simplicity to the primary flow element. This simplicity is further enhanced when the annular ring is provided with a projecting stem that is capable of conducting the sensed differential pressure to other flow processing accessories mounted on the stem.

DESCRIPTION OF THE DRAWINGS

FIG. 7 is an exploded view of the assembly of FIG. 6.

FIG. 8 is a prospective view of a modified form of the annular mounting ring of FIG. 5 wherein the annular ring supports a pitot tube type of primary flow element instead of the averaging orifice plate, as shown in FIG. 5.

FIG. 9 is an enlarged fragmentary prospective view of the exemplary pitot tube illustrated in FIG. 8 as being mounted within the annular ring.

DETAILED DESCRIPTION

Figure 1:
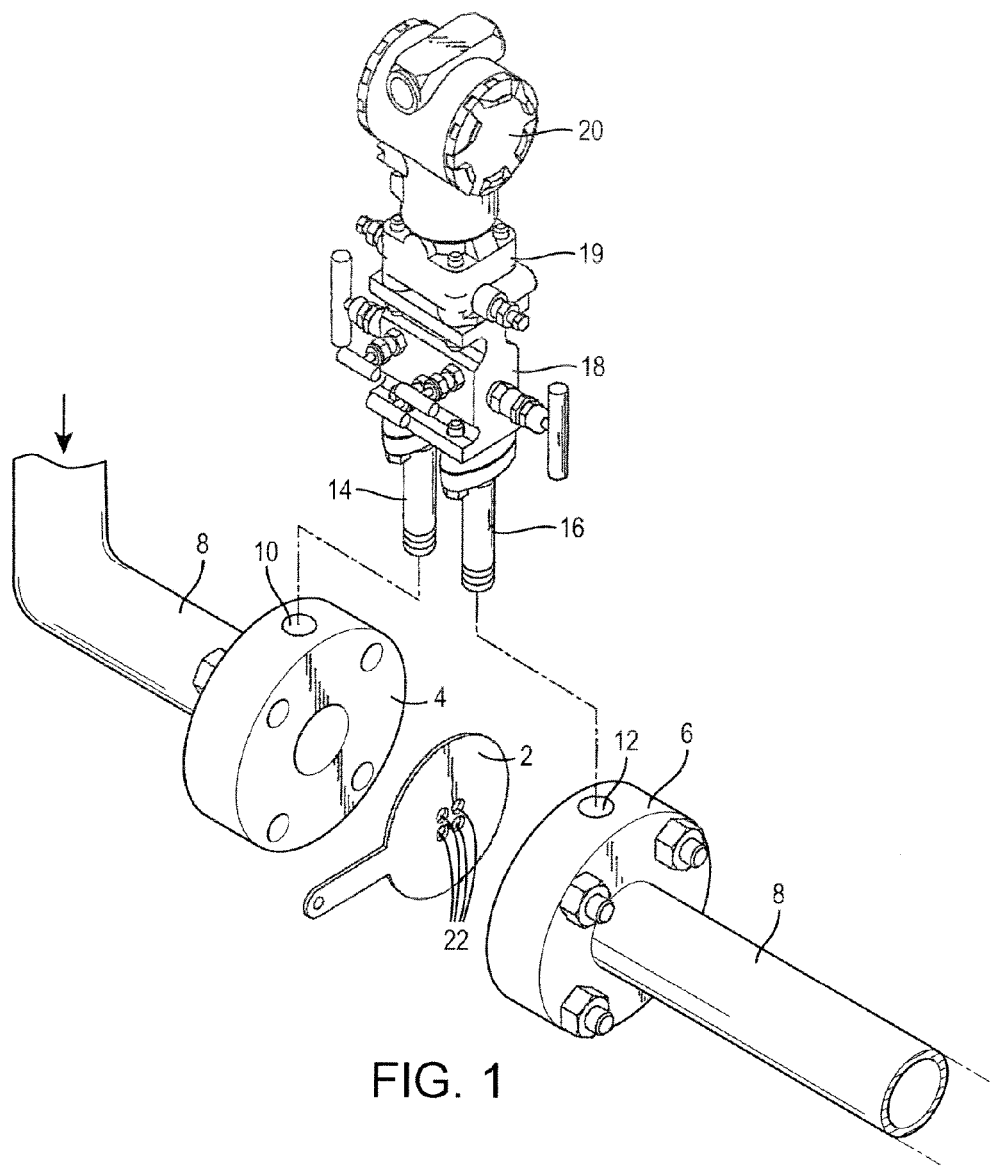
FIG. 1 is a perspective exploded view of an averaging orifice primary flow element of the present invention positioned between two opposing mounting flanges fixed to the ends of a fluid carrying conduit. Dashed lines indicate the connection of accessory flow processing devices with the upstream and downstream pressure ports disposed within the mounting flanges.
Figure 1A:
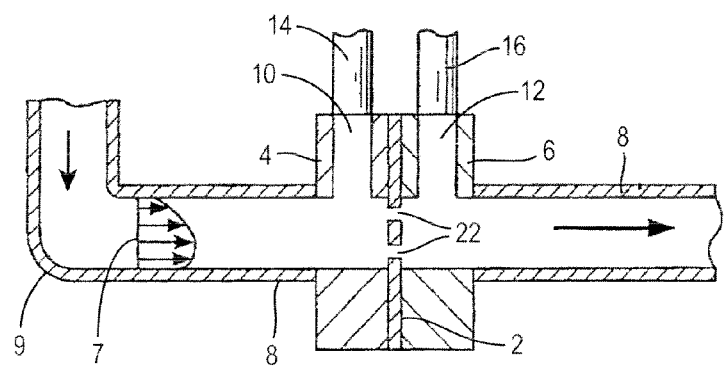
FIG. 1A is a fragmentary cross sectional view of the piping and primary flow element of FIG. 1, illustrating a representative velocity profile of the fluid in the pipe that would exist shortly downstream of an elbow in the piping.

A simplified version of the present invention is shown in FIGS. 1 and 1A. An averaging orifice primary flow element 2 is positioned between two opposing mounting flanges 4 and 6 fixed to the ends of a fluid-carrying conduit 8 just below an elbow 9 where the velocity profile 7 is skewed. Each of the mounting flanges contain a radially extending pressure sensing port 10 and 12 that communicate with the fluid flowing in the pipe and are respectively connected through conduits 14 and 16 to a valve manifold 18 and into a pressure transducer 19. An electrical signal that represents the sensed differential pressure between the ports 10 and 12 is transmitted by transmitter 20 to a processing unit (not shown).

Figure 2B:
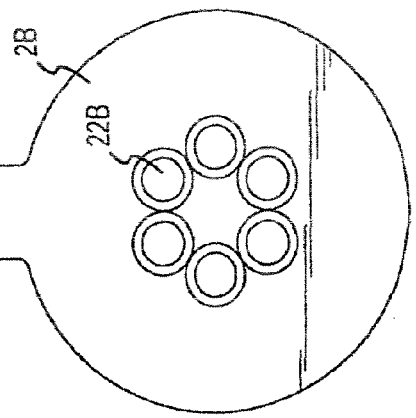
FIGS. 2, 2A and 2B are plan views of three different configurations of the averaging orifice primary flow element of the present invention. The views are taken from a position downstream of the orifice plate, looking upstream.
Figure 3:
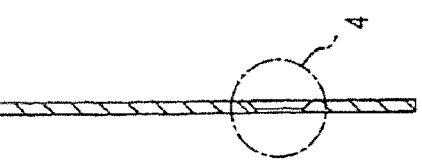
FIG. 3 is a cross sectional view taken along lines 3-3 of FIG. 2A.
Figure 2A:
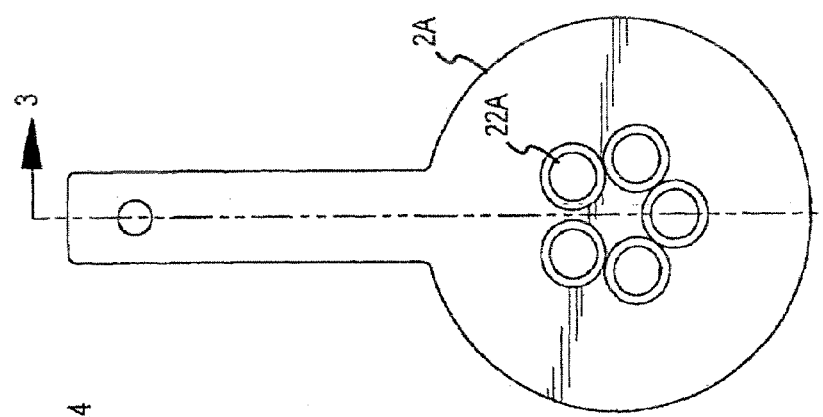
Figure 4:
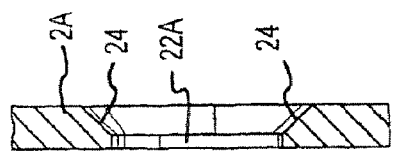
FIG. 4 is an enlarged fragmentary detail of a portion of FIG. 3.
Figure 2:
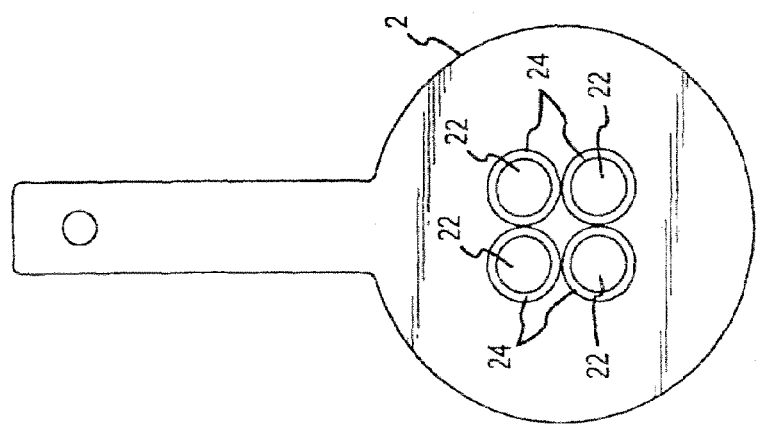

The primary flow element 2, also shown in FIG. 2, comprises a circular plate having four apertures 22 symmetrically arranged around the center of the plate 2. The center of the flow element plate 2 is positioned coaxially with the longitudinal centerline of the pipe 8. The plate 2 is retained in place by the sandwiching pressure of flanges 4 and 6. As shown in FIGS. 3 and 4, the circumferential edges 24 of the apertures 22 on the downstream side of the flow element plate 2 are preferably, but not necessarily, chamfered in order to facilitate expansion of the fluid column that flows through each aperture.

FIGS. 2A and 2B illustrate additional embodiments of the primary flow element in which there are an increased plurality of apertures 22A and 22B clustered around the center of primary flow element plates 2A and 2B. While the invention will be described with respect to the four aperture embodiment of FIG. 2, it is understood that four apertures in the primary flow element plate is only one of many possible configurations of apertures. One particular configuration and number of apertures may be more appropriate to a given fluid, fluid profile and piping characteristics than another. However, the principal of operation is the same, regardless of the number or location of apertures in the constricting plate. The number or configuration of apertures is not limited by the illustrations of FIGS. 2 through 2B.

It is seen from FIG. 1A that the velocity of the fluid approaching the upper pair of apertures 22 in the constricting plate 2 is less than the velocity of the fluid approaching the lower pair of apertures 22. These initial differences in fluid velocity will not only influence the static pressure sensed by the pressure port 10 on the upstream side of the plate 2, they will also impact the velocity of the fluid that passes through the respective pairs of apertures and accordingly, will affect the static fluid pressure sensed by the downstream port 12. Because the velocity of fluid through each of the apertures, or each pair of apertures, will be different, the static pressure on the downstream side of the plate 2 that is a function of the fluid velocity through each of the apertures will be averaged within the fluid and the downstream pressure port 12 will sense that averaged static pressure. With a plurality of apertures positioned around the center of the plate 2, such as, for example, the four apertures 22 shown in FIGS. 2 and 5, the static pressure will be averaged, even when the fluid profile is nonsymmetrical about two pipe axes, as it would be when the fluid is swirling.

Figure 5:
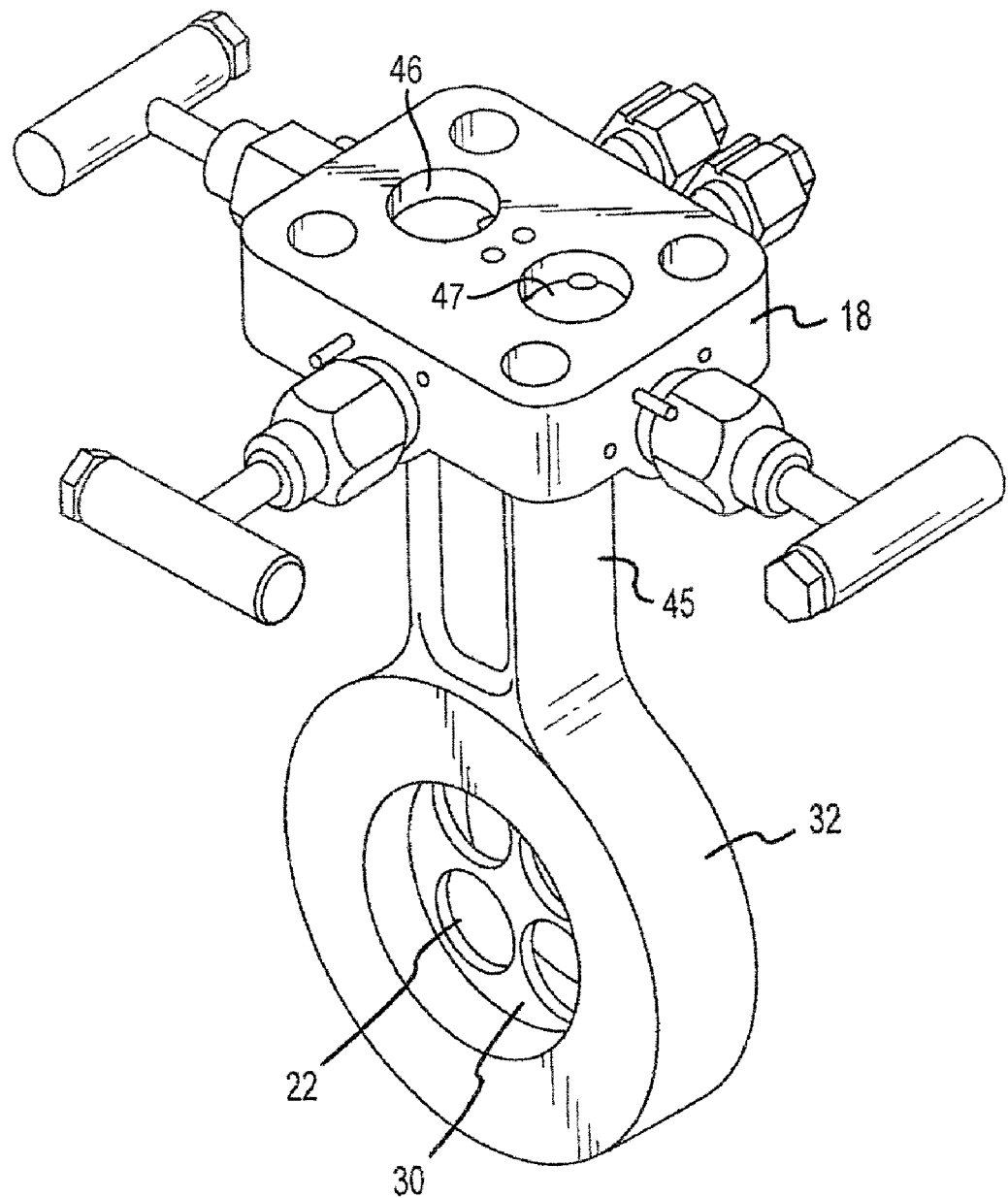
FIG. 5 is a perspective view of the embodiment of the present invention wherein the averaging orifice primary flow element is integrally incorporated intermediate the ends of an annular mounting ring with a projecting pressure communicating stem that mounts a valve-carrying manifold.
Figure 6:
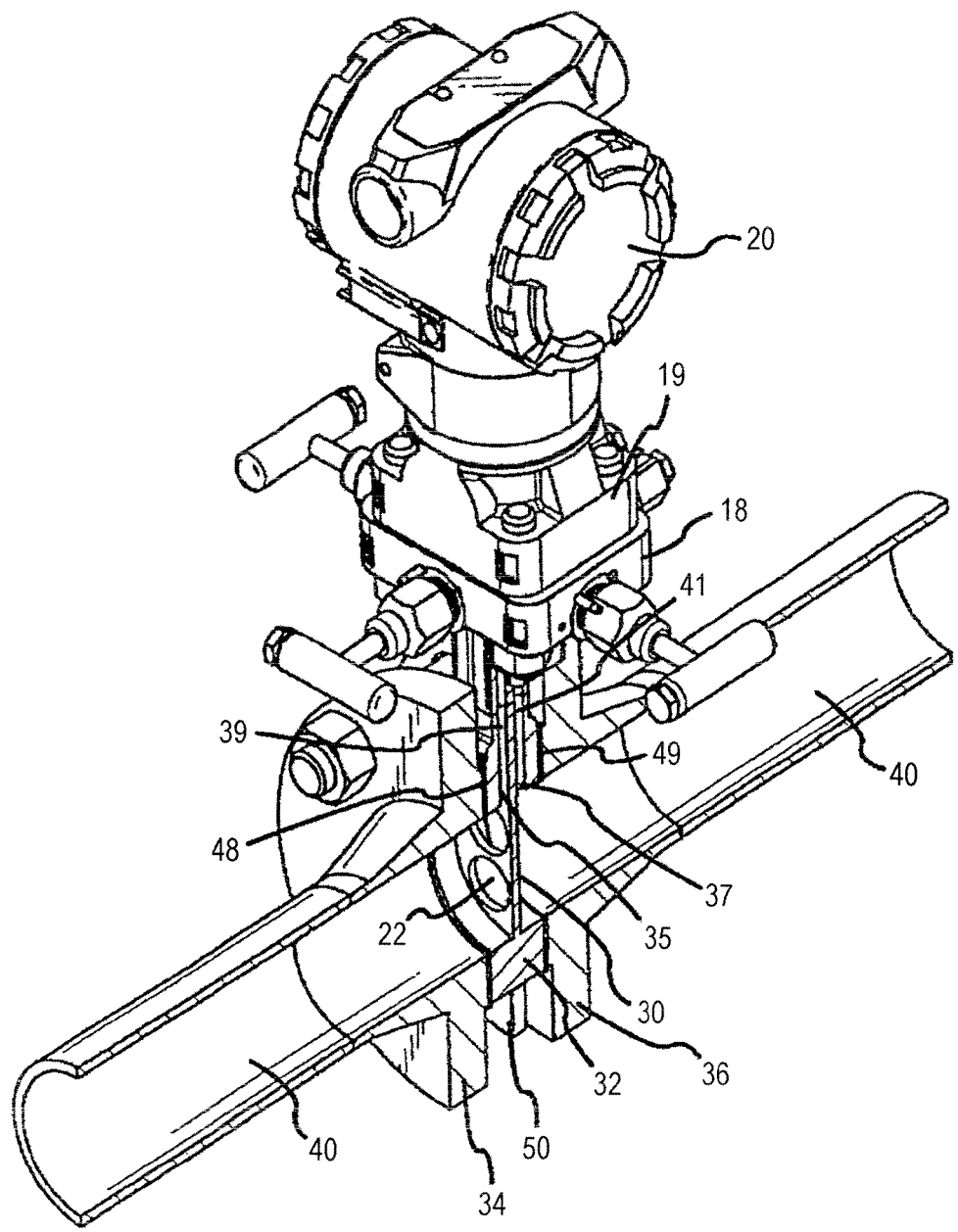
FIG. 6 is a fragmentary perspective view of the FIG. 5 embodiment of the present invention, as supported between opposing mounting flanges on the ends of a fluid carrying conduit.

A modified form of a four-aperture primary flow element plate 30 is shown in FIG. 5, integrally formed with the annular ring, or wafer, 32 that is insertable between the flanges 34 and 36 attached to the ends of two sections of a fluid-carrying pipe 40. Upstream and downstream pressure sensing ports 35 and 37 are located on each side of the flow element plate 30, as seen in FIG. 6. The pressure sensing ports 35 and 37 connect through conduits 39 and 41 in the stem 45 to conduits 46 and 47 in the manifold 18. The FIG. 5 embodiment is also illustrated in FIGS. 6 and 7, illustrating the total flow meter assembly inserted between pipe sections that carry the fluid whose flow rate is to be measured.

The wafer 32 is an annular ring whose inside diameter corresponds to the inside diameter of the fluid-carrying pipe 40. The flow element plate 30 is positioned across the ring opening substantially equi-distant from each of the lateral sides of the wafer ring 32. The wafer is mounted between two gaskets 48 and 49 that interface with the pipe end flanges 34 and 36. A semi-circular positioning ring 50 functions to position and secure the wafer 32 in its proper place between the pipe flanges. Positioning of the wafer 32 is achieved by placing it into the cradle formed by the interior of the ring 50 and seating the shanks of the fastening bolts 55 into the outer grooves of the ring.

With the averaging orifice plate 30 being integrally constructed with the mounting ring wafer 32 and the conduit carrying stem 45 and with the transmitter mounting manifold 18 being directly attached to the stem 45, several important advantages are achieved. Most importantly, the differential pressure generating mechanism, the pressure sensing ports, the manifold and the transmitter components are incorporated into a single unit that is easily insertable between the flanges of pipe sections. In addition, the differential pressure generating mechanism may comprise types of primary flow elements other than orifice plates. For example, as shown in FIG. 8, an averaging pitot tube 70, such as that disclosed in U.S. Pat. No. 6,321,166 B1, may be diametrically disposed across the opening of the ring wafer 32. A fragmentary section of an exemplary pitot tube 70 is shown in FIG. 9. Such a pitot tube has upstream and downstream facing surfaces 72 and 74 each with respective high pressure and low static pressure sensing ports 76 and 78 that communicate with interiorly disposed high and low pressure conducting conduits 80 and 82 connected to the piping conduits 84 and 86 housed in the annulus stem 45.

What is claimed is:

1. A differential pressure flow meter for determining the volumetric rate of fluid flow in a circular fluid conducting conduit, comprising:
   an annulus having a central opening that corresponds in shape and size to the inside fluid conducting section of the circular conduit,
   a supporting arm rigidly attached to and supported by the annulus and extending radially outwardly from the annulus, wherein the supporting arm comprises first and second interiorly disposed fluid transporting conduits, and
   a pitot tube type of fluid flow meter having a body that includes upstream and downstream facing surfaces carried by and mounted diametrically across the central opening of the annulus with at least one port disposed in each of the upstream and downstream facing surfaces, wherein the at least one port in the upstream facing surface is fluidly connected to one of the first and second fluid transporting conduits and the at least one port in the downstream facing surface is fluidly coupled to the other one of the first and second fluid transporting conduits.

2. The differential pressure flow meter of claim 1, wherein the pitot tube type of fluid flow meter includes;
   at least one total pressure port in the upstream facing surface,
   at least one static pressure port in the downstream facing surface, and
   total and static pressure plenums connected in fluid communication respectively to the total and static pressure ports.

3. The differential pressure flow meter of claim 2, further including first and second bores radially disposed in the annulus, respectively connected in fluid communication with the total and static pressure plenums.

4. The differential pressure flow meter of claim 3, wherein the first and second interiorly disposed fluid transporting conduits extend into the annulus and connect in fluid communication with the first and second bores in the annulus.

5. The differential pressure flow meter of claim 2, further including a transmitter fluidly coupled to the total and static pressure plenums through the annulus to determine the volumetric rate of fluid in the circular fluid conducting conduit.

6. The differential pressure flow meter of claim 5, wherein the transmitter is mounted on the supporting arm and is fluidly coupled to the first and second fluid transporting conduits.

7. The differential pressure flow meter of claim 2, wherein the annulus is held between first and second mounting flanges of the circular fluid conducting conduit when the flow meter is connected to measure flow within the circular fluid conducting conduit.

8. The differential pressure flow meter of claim 1, wherein the pitot tube type of fluid flow meter includes;
   a plurality of total pressure ports in the upstream facing surface,
   a plurality of static pressure ports in the downstream facing surface, and
   total and static pressure plenums connected in fluid communication respectively to the total and static pressure ports.

9. The differential pressure flow meter of claim 8, wherein the total pressure ports are disposed on a single line perpendicular to the longitudinal axis of the fluid conducting conduit and along a diameter of the central opening.

10. The differential pressure flow meter of claim 8, wherein each of the plurality of total pressure ports comprises an elongated slot.

11. The differential pressure flow meter of claim 8, wherein each of the plurality of static pressure ports comprises a circular hole.

12. The differential pressure flow meter of claim 8, wherein multiple ones of the plurality of total pressure ports are disposed on a line perpendicular to the longitudinal axis of the fluid conducting conduit and along a diameter of the central opening.

13. The differential pressure flow meter of claim 12, wherein multiple ones of the plurality of static pressure ports are disposed on a line perpendicular to the longitudinal axis of the fluid conducting conduit and disposed parallel to but offset from the line on which the total pressure ports are disposed.

* * * * *